Figure 1:
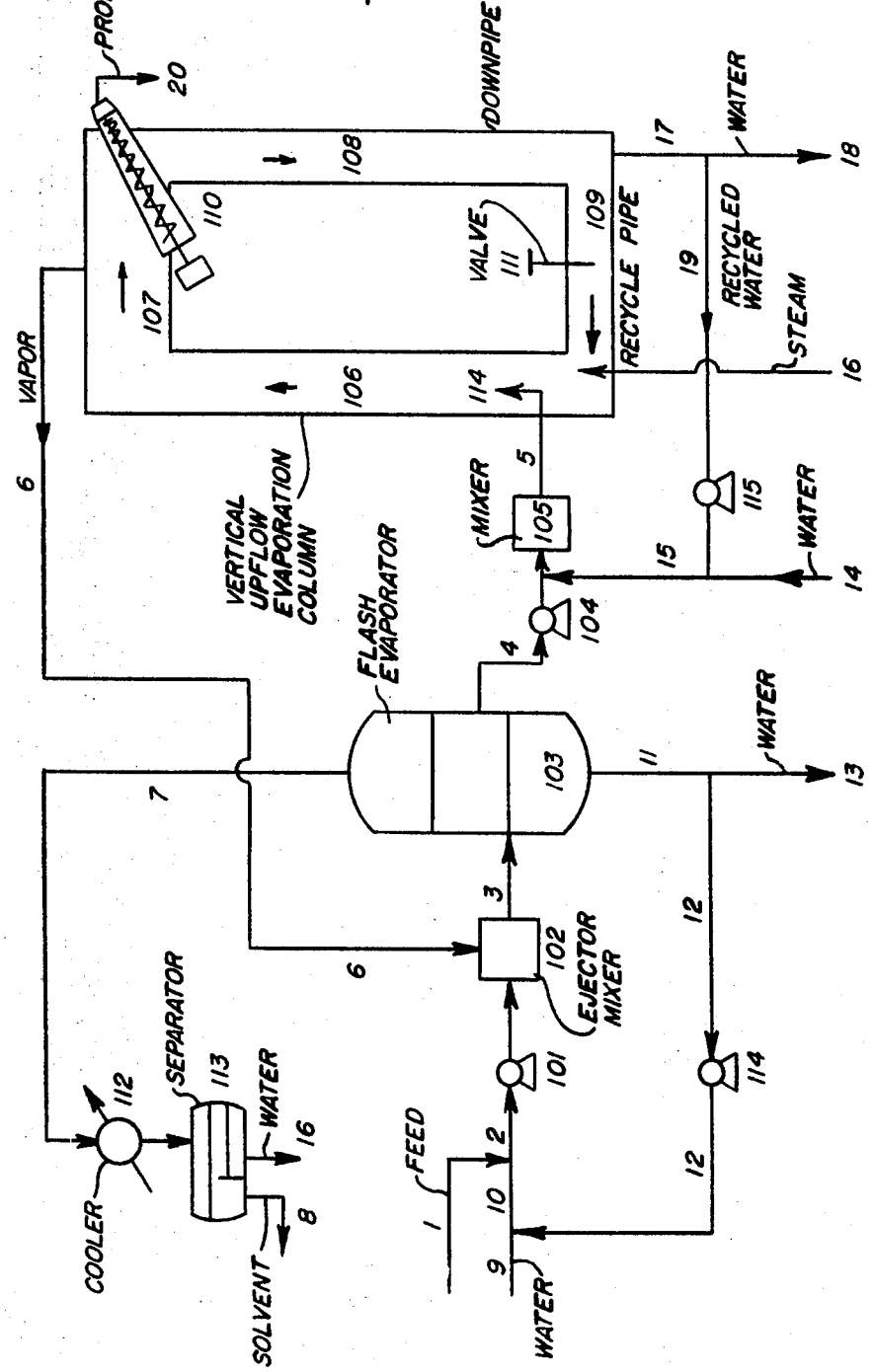

United States Patent

[11] 3,608,611

[72] Inventors Teruo Oshima
7-17, Oide-cho, Nishinomiya;
Mamoru Asada, 6-546, 2-chome, Ikku-cho;
Kazu Baba, 6-317, 2-chome, Ikku-cho;
Shinichi Arakawa, 9, 1-chome, Yushudai-nishi; Akira Miyashita, 29-7, 2-chome,
Oike, Ibaraki, all of Japan
[21] Appl. No. 859,840
[22] Filed Sept. 22, 1969
[45] Patented Sept. 28, 1971
[32] Priority Sept. 21, 1968
[33] Japan
[31] 43/68583

[54] METHOD FOR RECOVERING A RUBBERLIKE HIGH MOLECULAR WEIGHT POLYMER
5 Claims, 2 Drawing Figs.

[52] U.S. Cl. .................................................. 159/47,
260/29.7 PT, 260/83.3, 260/85.2 S, 260/85.1,
260/94.7 R, 260/96 R, 260/DIG. 22
[51] Int. Cl. .................................................. B01d 1/00
[50] Field of Search .................................................. 159/DIG.
10, 47, 27 A, 16, 16 S; 260/816, 94.7, 94.9 F, 29.7
PT, 83.3, 85.1, 85.2 S, 94.7 R, 96 R, DIG. 22

[56] References Cited
UNITED STATES PATENTS

| | | | |
|---|---|---|---|
| 521,974 | 6/1894 | Cooper | 159/2 |
| 2,879,839 | 3/1959 | Carpenter et al. | 159/47 |
| 2,915,489 | 12/1959 | White | 260/33.6 |
| 3,179,642 | 4/1965 | Pflegerl et al. | 260/88.2 |
| 3,266,556 | 8/1966 | Malek | 159/16 |
| 3,505,111 | 4/1970 | Malek | 159/16 X |

Primary Examiner—Norman Yudkoff
Assistant Examiner—J. Sofer
Attorney—Patrick Bright ABSTRACT: Method and apparatus for concentrating an organic solvent solution or slurry of rubbery or thermoplastic polymers, and for recovering such polymers wherein the solution or slurry is fed to a column filled with heated water, the solvent is evaporated, thereby developing a difference in specific gravity between the column contents and the heated water, and circulating the heated water through the column by utilizing the difference in specific gravity. The apparatus comprises a polymer recovery column, a downpipe, a vessel connecting the upper part of the polymer recovery column with the downpipe, and a pipe connecting the intermediate part or the lower part of the column with the downpipe.

METHOD FOR RECOVERING A RUBBERLIKE HIGH MOLECULAR WEIGHT POLYMER

This invention relates to a method and to an apparatus for separating and recovering rubber high molecular weight polymers from an organic solvent solution, or from an organic solvent slurry containing therein solid polymer particles (which is hereinafter referred to as "solution of slurry of polymer").

A difficult problem in separating polymer and solvent from a solution or slurry of polymer is that the viscosity of the system increases greatly during the step of separating the solvent from the solution or slurry of polymer by evaporation. The polymer adheres to the vessel wall, necessitating use of such devices as an indirect heating system, for example, to raise the temperature of the heating medium. However, decomposition of polymers is more likely to occur when the temperature of the heating medium is raised. Rotating film evaporators are sometimes used to avoid this problem but use of such devices is limited by the molecular weight of the major polymer to be recovered.

To avoid these problems, a method using the principle of steam distillation has been proposed. Japanese Pat. Publication No. 5596/63 discloses a method for recovering polymer crumbs by feeding a polymer solution to the lower part of a hot water distillation column, and withdrawing the polymer crumbs from the upper part of the column by flowing water through the column. However, when the amount of flowing water is small, the polymer crumbs separated from the solvent accumulate at the upper part of the column, and agglomerate to form larger masses. To avoid this, it is necessary to circulate a rather large amount of water, requiring a pumping facility and large power supply, and both are costly.

Still another problem with this process is the costly loss of heat. In the upper part of the column, the system consists of a mixed three-phase flow of water, vapor (mixed vapor of solvent and water), and solid polymer (containing the solvent). Compositions of these components in the vapor phase and in the solid phase in an equilibrium state can be determined from the phase rule if the pressure and the temperature are known.

Figure 2:
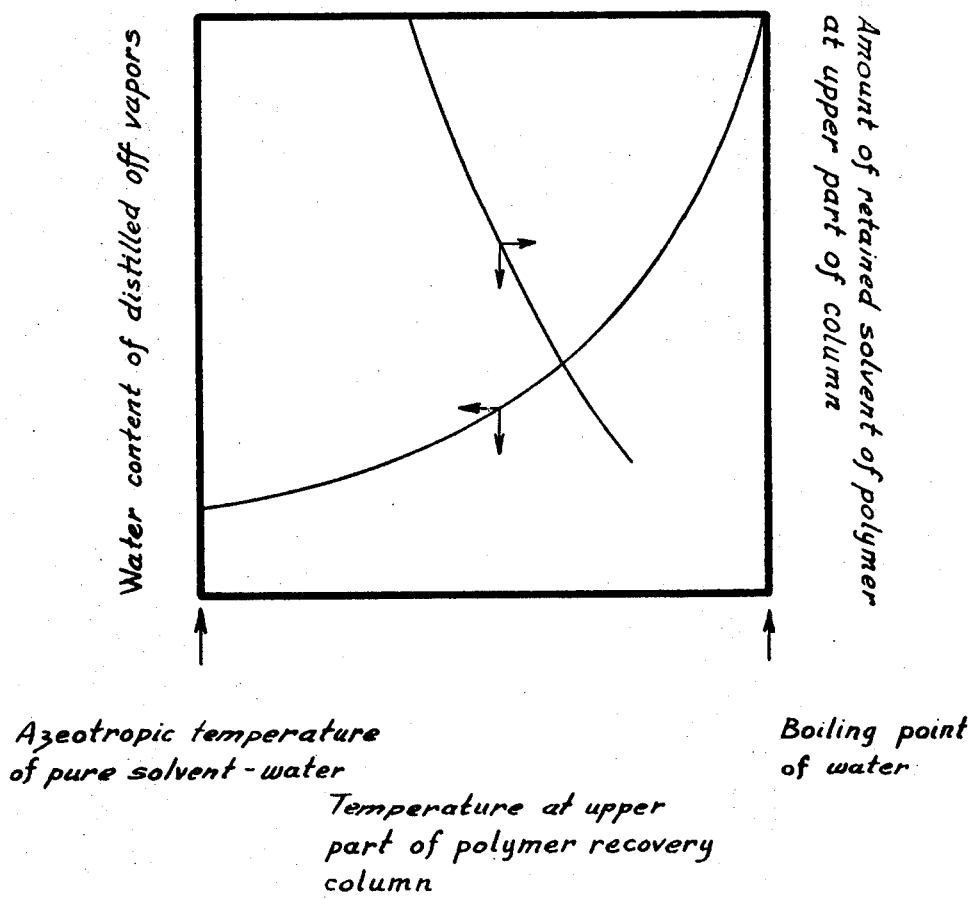

FIG. 2 shows the relative amounts of the components in the vapor phase and in the solid phase in an equilibrium state under a definite pressure, and temperature. In a nonequilibrium state, the retained solvent percentage of the polymers is greater than that in the equilibrium state at the same temperature, but as the residence time within the column increases, the retained solvent percentage approaches that of the equilibrium state.

However, even if a sufficient residence time is allowed, it is necessary to raise the temperature in the upper part of the column to decrease the retained solvent percentage of the polymer to be recovered. As a result, the steam content of the vapors leaving the upper part of the column is increased, and the amount of heat necessary for recovering a unit amount of the solvent becomes larger.

An object of the present invention is to provide an efficient and low-cost method and apparatus for recovering a rubbery high molecular weight polymer.

Another object is to provide a novel method for polymer recovery which is industrially advantageous because of low power and heat consumption per unit of polymer recovered.

The present invention provides:
1. A method for recovering a rubbery, high molecular weight polymer, wherein a polymer is recovered from an organic solvent solution of the polymer or a slurry containing the polymer in the form of particulate solids, characterized by feeding an organic solvent solution of polymer, or a slurry containing polymers as particulate solids to the lower part of a polymer recovery column (or vertical upflow evaporation column) which is filled with hot water and which is connected with a downpipe by means of a vessel at the upper part of the column and also by means of a pipe at the lower part or at an intermediate part of the column; evaporating the solvent in the polymer recovery column, developing a difference in specific gravity between the content of the polymer recovery column and that of the downpipe by the generated vapors; and circulating hot water through the column by utilizing said difference in specific gravity.

2. A method for recovering a rubberlike high molecular weight polymer, characterized by mixing mixed vapors of solvent and water evaporated at the upper part of the polymer recovery column in (1) with a solution or slurry of polymer in a first mixer, concentrating the solution or slurry of polymer in a concentrating tank, and then supplying it to the lower part of the polymer recovery column.

3. An apparatus for recovering a rubberlike high molecular weight polymer, characterized in that a polymer recovery column is connected with a downpipe by means of a vessel at the upper part of the column and a connecting pipe at the lower part or the intermediate part of the column, thus forming a cyclic polymer recovery system.

Polymers and copolymers of diolefins or monoolefins such as (a) polybutadiene, polyisoprene, polychloroprene, styrene-butadiene copolymer, butadiene-acrylonitrile copolymer, isobutene-isoprene copolymer, ethylene-propylene copolymer, or copolymer of ethylene-propylene-dienes obtained by solution polymerization or (b) solid polypropylene, or ethylene-modified solid polypropylene copolymers including considerable amount of solvent-soluble polymers obtained by polymerization in an organic solvent, can be recovered by the treatment according to the present method and apparatus.

As an organic solvent, alkanes having 5 to 12 carbon atoms, cycloalkanes having 5 to 12 carbon atoms, aromatic compounds having 6 to 12 carbon atoms, halogenated hydrocarbons having 1 to 7 carbon atoms and their mixtures, which are substantially immiscible with water, are preferable, and pentane, heptane, cyclohexane, benzene, toluene, ethyl chloride, carbon tetrachloride and the like are mentioned as typical solvents.

FIG. 1 shows one embodiment of the present invention, and FIG. 2 is an equilibrium relation among a temperature at the upper part of a polymer recovery column, the retained solvent percentage of the recovered polymer, and the water content of distilled vapors.

One embodiment of the present invention is hereunder explained in detail, referring to FIG. 1.

A polymer solution or slurry containing 1 to 50 percent by weight of polymers obtained from a polymerization process is fed to a first mixer 102 by means of a pump 101 through a feedpipe 1. Optionally, up to 30 volumes of water can be added thereto through feedpipe 10. Typically, the temperature of the water from the feedpipe 10 will be between 0° and 100° C. Mixer 102 can be an ejector-type mixer or other in-line-mixing device.

Vapors coming from a vessel 107 at the upper part of the polymer recovery column 106 are fed to mixer 102 through a pipe 6, and the mixture is sent to a concentrating tank 103, where the concentration may be changed to from 1.1 to 10 times the original concentration.

In the concentrating tank 103, part of the solvent and water boil azeotropically, and the vapor is recovered and passes to cooler 112 through a pipe 7. The condensate solution is separated into the solvent and water in a separating tank 113, and the solvent and water are recovered through pipes 8 and 16 respectively.

The amount of the solvent to be evaporated in the concentrating tank 103 depends upon the difficulty in handling a polymer solution or slurry to be concentrated and the desired heat balance of the entire system.

The water separated from the lower part of the concentrating tank is recycled to the first mixer 102 through a pipe 12 and pumps 114 and 101 or discharged to the outside of the system through a pipe 13.

The polymer solution or slurry concentrated in the concentrating tank 103 is fed to the second mixer 105, and from there passes to the lower part of the polymer recovery column 106 through a nozzle 114. Optionally, up to 30 volumes of water may be added thereto via pipe 15.

The temperature of water coming from the pipe 15 is not critical, but heated water at about 100° C. will typically be used. Water fed via pipe 15 consists of recycled water passing from the polymer recovery column through pipe 19 and/or water from an outside source fed through pipe 14.

The nozzle 114 is throttled at its outlet part and has a structure which represses the evaporation of the solvent in the mixer 105 and pipe 5.

The polymer recovery column 106 is filled with heated water, and its temperature, which may vary, is adjusted by steam fed through the pipe 16. This temperature is dependent upon the amount of the retained solvent in the polymer to be recovered, and the amount of heat to be transferred from the first mixer 102 to the concentrating tank 103. Said temperature is between the azeotropic temperature of water and the solvent under the operating pressure and the boiling point of water.

The polymer crumbs, from which the solvent is removed in the polymer recovery column 106, are led to the outside of the system by means of a screw conveyor, belt conveyor, apron conveyor or other conveying device 110 and recovered, or led to the outside of the system in a state that the polymers are suspended in water, together with part of the recycling water, and recovered.

Mixed vapors of water and the solvent generated at the upper part of the polymer recovery column contain more water vapor than the azeotropic composition of the solvent and water, because the polymer recovery column is operated at a higher temperature than the azeotropic temperature of the solvent and water. The distilled-off vapors containing such an excess amount of heat are led to the concentrating tank 103 from the first mixer 102 through a pipe 6, and the excess amount of heat in the distilled-off vapors is recovered by concentrating the polymer solution or slurry therein.

The polymer recovery column 106 is connected to a downpipe 108 by means of a vessel 107 at the upper part of the column and a connecting pipe 109 at the lower part of the column, and water is automatically circulated through these pipes and vessels in the following manner.

The inside of the polymer recovery column 106 is in a state of mixed polyphase of water, the polymer solution or slurry, polymer crumbs free of the solvent and vapors generated from these. Thus, the apparent specific gravity of such a mixed phase is less than that of water. On the other hand, the downpipe 108 is filled with water and thus there is brought about a difference in specific gravity between the content of the polymer recovery column 106 and the liquid of the downpipe 108. The pressure at the lower part of the downpipe 108 is higher than the pressure at the lower part of the polymer recovery column 106. The water flow between the polymer recovery 106 and the downpipe 108 is proportional to differential pressure between them. The amount of circulating water depends upon the amount of the solvent to be supplied from the concentrating tank 103, that is, the amount of the generated vapors, and conduit resistances at 106, 107, 108, 109, and all other points within the circulating water system. Further, it is possible to adjust the amount of circulating water in a great range by using a shutter (generally, a flow-regulating means such as a valve) 111, if necessary.

The downpipe 108 has a size in a range which will not restrict the necessary amount of the circulating water. Shape of the structure at the upper part of the polymer recovery column is not limited, so long as it does not prevent the automatic circulation of water.

Advantages of the present method and apparatus over the conventional method and apparatus are enumerated as follows:

1. The solution or slurry of the polymer to be recovered is mixed in mixer 102, as it is or as in a state of being mixed with water in advance, with the distilled-off vapors containing excess water vapor supplied from the upper part of the polymer recovery column, and the excess water vapor is heat exchanged with the solution or slurry of the polymer and condensed. Part of the solvent of said polymer solution or slurry is evaporated by such heat exchange, and the polymer solution or slurry is concentrated, whereby the amount of heat possessed by the excess water vapor of the distilled-off vapors from the polymer recovery column is recovered. Such concentrating operation is very effective in offsetting the decrease in heat efficiency of the polymer recovery column, encountered when the retained solvent percentage of the polymers crumbs obtained in the polymer recovery column is to be reduced.

2. The most of the catalyst residue in the polymer solution or slurry is extracted into an aqueous phase through mixing with water and water vapor. The extracted catalyst residue is discharged to the outside of the system by the flow of extracting water.

3. The polymer recovery column and the downpipe constitute a closed circuit by means of the vessel at the upper part of the column and the connecting pipe at the lower part or the intermediate part of the column, and the inside thereof is filled with hot water. The apparent specific gravity of the content of the polymer recovery column becomes lower than that of the content (hot water) of the downpipe owing to the vapors generated from the polymer solution or slurry supplied to the polymer recovery column, and hot water flows from the downpipe into the polymer recovery column. As a result, a large amount of water can be circulated without using any water-circulating pump. By providing a shutter or a control valve at a suitable place in the circulating system, the amount of circulating hot water can be regulated within a wide range. The circulation of hot water produced by the practice of the invention eliminates the need for a pump and its high energy consumption.

4. The polymers obtained at the upper part of the column are withdrawn in dried form or together with part of the flowing water, and continuously taken out of the system.

The present invention is hereunder explained, referring to examples, but is not limited to these examples.

EXAMPLE 1

Copolymerization of ethylene and propylene was effected using n-heptane as a solvent and a catalyst system consisting of an organoaluminum and a vanadium compound, and a solution containing 6 percent by weight of copolymer was obtained. This copolymer contained 50 percent by mole of ethylene unit and had an intrinsic viscosity $[\eta]$ of 1.7 dl./g. (deciliters per gram) (in xylene at 120° C.).

The n-heptane solution of said copolymer was fed to an ejector-type mixer 102 by means of a pump 101 after having been mixed with hot water. In the first mixer 102, it was mixed with vapors distilled from a vessel 107 at the upper part of a polymer recovery column, and led to a concentrating tank 103. Part of n-heptane was azeotropically boiled with water and evaporated from the upper part of the concentrating tank 103. The composition of vapors generated in the concentrating tank 103 was almost equal to the azeotropic composition of water and n-heptane, and its water content was less than that of the vapors distilled off from the upper part of the polymer recovery column.

Water was separated from the lower part of the concentrating tank 103, and water was discharged to the outside of the system through a pipe 13. The concentrated n-heptane solution of the polymers was mixed with hot water at 100° C. under pressure in the second mixer 105, and was supplied in a state of being dispersed in water, to a polymer recovery column 106.

A polymer recovery column having an inner diameter of 10 cm. and a height of 2 m. and a downpipe having an inner diameter of 10 cm. were used.

n-Heptane was evaporated in the polymer recovery column, and the polymers were agglomerated to masses having sizes of 5 mm. to a few centimeters and floated towards the upper part of the polymer recovery column.

By a twin-screw extruder 110 provided at the upper part of the polymer recovery column, the polymers were taken out of the system. The retained heptane content of the recovered polymer crumbs was measured. The vapors distilling off from the upper part of the polymer recovery column 106 were circulated to the first mixer 102 and used in the concentrating tank 103 to concentrate the diluted polymer solution, whereby the amount of heat possessed by the excess water vapor was recovered.

The circulating water from the downpipe 108 to the polymer recovery column 106 was regulated by a shutter 111 to have a specified amount as shown in table 1.

In table 1, operating conditions and retained heptane content of the recovered polymer are shown.

TABLE 1

| Test Run No. | 1 | 2 | 3 | 4 |
|---|---|---|---|---|
| Polymer solution feed rate (pipe 1) (kg./hr.) | 32 | 32 | 32 | 32 |
| Polymer solution concentration (percent by weight) | 6 | 6 | 6 | 6 |
| Polymer solution temperature (° C.) | 50 | 50 | 50 | 50 |
| Water feed rate (pipe 9) (kg./hr.) | 30 | 30 | 30 | 30 |
| Feed water temperature (pipe 9) (° C.) | 100 | 80 | 100 | 25 |
| Polymer solution feed rate after preliminary concentration: | | | | |
| Pipe 4 (kg./hr.) | 17 | 17 | 17 | 17 |
| Concentration (percent by weight) | 12 | 12 | 12 | 12 |
| Hot water feed rate (pipe 14) (kg./hr.) | 15 | 15 | 15 | 15 |
| Feed water temperature (pipe 14) (° C.) | 100 | 100 | 100 | 100 |
| Temperature of upper part of polymer recovery column 106 (° C.) | 90 | 91 | 85 | 95 |
| Circulating water rate of polymer recovery column 106 (kg./hr.) | 300 | 500 | 200 | 900 |
| Retained n-heptane content of recovered polymer line 20 (g. heptane/100 g. dried polymer) | 13 | 8 | 28 | 4 |

EXAMPLE 2

Propylene containing a small amount of ethylene was polymerized by using n-heptane as a solvent and a catalyst system consisting of an organoaluminum and a titanium compound, whereby a slurry containing solvent-soluble polymers and solvent-insoluble polymers was obtained. The slurry contained 16 g. of n-heptane-insoluble polymers and 4 g. of n-heptane-soluble polymers per 100 g. of n-heptane. The n-heptane-soluble portion of the polymers had $[\eta]$ of 1.5 dl./g. (in tetraline at 135° C.) and the n-heptane-insoluble portion of the polymers had $[\eta]$ of 2.5 dl./g. (in tetraline at 135°C).

Recovery of the polymers was effected in the manner similar to that of example 1 using an apparatus as shown in FIG. 1. The operating conditions are shown in table 2.

TABLE 2

| | Kg./hr. | ° C. |
|---|---|---|
| Slurry (pipe 1) | 36 | 50 |
| Water (pipe 9) | 36 | 80 |
| Concentrated slurry (pipe 4) | 19 | 80 |
| Water (pipe 14) | 19 | 100 |
| Temperature at upper part of polymer recovery column 106 | | 91 |
| Circulating water rate in polymer recovery column 106 | 500 | |

The amount of retained solvent of the recovered polymers was 2.2 g. of heptane per 100 g. of dried polymers.

EXAMPLE 3

Cis-1,4-polybutadiene was recovered from a toluene solution containing 10 percent by weight of cis-1,4-polybutadiene in the operating manner similar to that of example 1, using an apparatus as shown in FIG. 1. However, a polymer recovery column having an inner diameter of 30 cm. and a height of 5 m. was used.

The operating conditions for recovering the polymers are shown in table 3.

TABLE 3

| | Kg./hr. | ° C. |
|---|---|---|
| Polymer solution (pipe 1) | 110 | 50 |
| Water (pipe 9) | 110 | 84 |
| Concentrated polymer solution (pipe 4) | 60 | 84 |
| Water (pipe 15) | 60 | 100 |
| Temperature at upper part of polymer recovery column 106 | | 93 |
| Circulating water rate in polymer recovery column 106 | 4,500 | |

In this case, the amount of heat required to recover 1 kg. of dried polymers was 2,540 Kcal. When the mixed vapors of the solvent and water leaving the polymer recovery column was directly recovered in a condenser without using the method and apparatus of the present invention, the amount of heat required to recover 1 kg. of the polymer was 5,200 Kcal. Superiority of the present invention was clearly shown thereby.

What is claimed is:

1. A method for recovering a rubbery or thermoplastic high molecular weight polymer, wherein a polymer is recovered from an organic solvent solution of the polymer or a slurry containing the polymer in the form of particulate solids, and wherein a cyclic system is used, said system comprising a vertical upflow evaporation column, a downpipe, a vessel connecting the upper parts of said column and said downpipe, and a recycling pipe connecting the lower region of said column to the lower part of said downpipe comprising feeding the organic solvent solution or slurry to the lower part of said column which is filled with heated water; evaporating the solvent in said column, thereby developing a difference in specific gravity between the content of said column and the content of said downpipe by the generated vapors, thus circulating the heated water through said system by utilizing the difference in specific gravity, mixing an azeotropic mixture of solvent and water obtained at the upper part of said column with the feed solution or slurry of polymer and then feeding the mixture of said azeotrope solution or slurry to the lower part of said column.

2. The method of claim 1 further comprising flash evaporating in a flash evaporator the solution or slurry of polymer after said mixing, but before feeding the mixture of said azeotrope and solution or slurry to the lower part of said column.

3. The method of claim 2 further comprising regulating the temperature and amount of heated water in said column to recover the solvent from said organic solvent solution or slurry.

4. The method of claim 2 further comprising further mixing the partially evaporated mixture of azeotrope and said organic solvent solution or slurry with up to 30 volumes of heated water after evaporating the first mixture but before feeding the further mixture to the bottom of said column.

5. The method of claim 4 further comprising recycling warm water from the downpipe via the recycling pipe to the bottom of the column to merge with the further mixture.